(12) United States Patent
Basso et al.

(10) Patent No.: US 7,333,493 B2
(45) Date of Patent: Feb. 19, 2008

(54) METHOD FOR PREVENTION OF OUT-OF-ORDER DELIVERY OF DATA PACKETS

(75) Inventors: Claude Basso, Raleigh, NC (US); Jean L. Calvignac, Cary, NC (US); Natarajan Vaidhyanathan, Carrboro, NC (US); Fabrice J. Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 799 days.

(21) Appl. No.: 10/850,296

(22) Filed: May 20, 2004

(65) Prior Publication Data

US 2005/0259659 A1    Nov. 24, 2005

(51) Int. Cl.
*H04L 12/28* (2006.01)
(52) U.S. Cl. ...................................................... 370/394
(58) Field of Classification Search ..................... None
See application file for complete search history.

(56) References Cited

U.S. PATENT DOCUMENTS

| | | | |
|---|---|---|---|
| 4,774,706 A | 9/1988 | Adams | 370/94 |
| 5,311,516 A | 5/1994 | Kuznicki et al. | 370/94.1 |
| 5,434,858 A | 7/1995 | Shimada | 370/68.1 |
| 5,920,705 A | 7/1999 | Lyon et al. | 395/200.7 |
| 6,026,093 A | 2/2000 | Bellaton et al. | 370/412 |
| 6,173,386 B1 * | 1/2001 | Key et al. | 712/10 |
| 6,331,978 B1 | 12/2001 | Ravikanth et al. | 370/392 |
| 6,336,129 B1 | 1/2002 | Ise et al. | 709/201 |
| 6,341,129 B1 | 1/2002 | Schroeder et al. | 370/354 |
| 6,381,242 B1 | 4/2002 | Maher, III et al. | 370/394 |
| 6,654,373 B1 * | 11/2003 | Maher, III et al. | 370/392 |
| 6,741,595 B2 * | 5/2004 | Maher et al. | 370/392 |
| 6,937,606 B2 * | 8/2005 | Basso et al. | 370/412 |
| 6,947,425 B1 * | 9/2005 | Hooper et al. | 370/394 |

OTHER PUBLICATIONS

Allen et al, IBM PowerNP network processor: Hardware, software, and applications, IBM J. Res. vol. 47 No. 2/3, pp. 177-193, Mar./May 2003.*

* cited by examiner

*Primary Examiner*—Frank Duong
(74) *Attorney, Agent, or Firm*—Joscelyn G. Cockburn; William N. Hogg; Driggs, Hogg & Fry Co., LPA

(57) ABSTRACT

A method for sequencing delivery of information packets from a router having several processing elements to a receiving processing installation, wherein delivery of the packets must be completed in the order the packets arrive at the router. A linked list of packets is formed in the order they are received at the router, and each packet fragmented into successive fragments. Each fragment is processed at the router. The last fragment of each packet in each linked list is labeled with the sequence in which the packet was received, and enqueued in the order labeled for each last fragment on each linked list. Each fragment of each packet is delivered as processed, except the last fragment of each packet on its linked list to the receiving processor installation, and thereafter, transmitting the final fragment of each packet after processing only if that fragment is at the head of the queue.

3 Claims, 1 Drawing Sheet

METHOD FOR PREVENTION OF OUT-OF-ORDER DELIVERY OF DATA PACKETS

BACKGROUND OF THE INVENTION

In typical processor installations wherein information is transmitted through a router, it is necessary, when multiple packets of information are destined for the same location, that each packet be transmitted in the order received. When there is but a single processing element at the router, this presents no problem. That is, if two packets P1 and P2 with the same destination address arrive at the same port at the router, with P1 arriving prior to P2, and if both of them are to be forwarded via the same port, then P1 should be transmitted prior to P2 on the destination port. That is, the router should not transmit P2 prior to transmitting P1. The departure order should be same as the arrival order. This is important because the final destination host, when it receives an out-of-order packet, implicitly assumes that the not-yet arrived prior packets are lost packets and proceeds with the assumption that network congestion is causing the packet loss and reduces its TCP (Transmission Control Protocol) window. This minimizes the effective communication bandwidth between the end points involved in the communication.

If there is only one processor element handling all the packets, then it processes the packets sequentially and, consequently, there is no problem in maintaining sequence. However, modern networking devices have multiple processing elements forwarding packets simultaneously to enable increased throughput.

As an example, consider the following situation:

Packet 1 and Packet 2 each have the same destination address and arrive in that same order at the same port. Packet 1 is assigned to PE 1 for processing and packet 2 is assigned to PE 2 for processing, the processing being necessary before the packets of data are forwarded. In general, it is possible for PE 2 to finish processing packet 2 sooner than PE 1 finishes processing its packet. If appropriate steps are not taken, PE 2 will transmit P2 out of the system before PE 1 is able to transmit P1. Such a scenario results in out-of-order delivery. This problem can be easily solved if there is but one processing element at the router, by completely processing the packets as they are received.

In IBM's PowerNP architecture wherein there are multiple processing elements, the problem of out-of-order delivery is solved by using completion unit labels. When a packet enters the system, before it is passed to one of the PEs, it is classified into a communication flow and assigned a "completion unit label". Packets belonging to the same communication flow will receive the same completion unit label.

In the above example, P1 and P2 will receive the same completion unit label, and a linked list of PEs will be attached to this label. When P1 is assigned to PE T1, T1 will be in the head of the linked list. Later, when P2 is assigned to PE T2, T2 will be appended to the linked list in the end. When a PE finishes the processing of the packet, it will make an attempt to transmit the frame by invoking the command "enqueue with label". This means that the completion unit will transmit the frame out of the port if, and only if, the PE that is making the "enqueue with label" attempt is at the head of the PE queue for the corresponding label. After transmitting the frame, the PE will be removed from the head of the PE queue. This is illustrated in FIG. 1.

As shown in FIG. 1, packets 1 and 2 belong to the same flow. Packet 1 arrives first and then packet 2 arrives. Packets 3 and 4 belong to the same flow. Packet 3 arrives first and then packet 4. Packet 1 gets assigned to the PE 1. The system assigns the label L1 to packets 1 and 2, since they belong to the same but different communication flow. Similarly, Label L2 is assigned to packets 3 and 4. (Typically, L1 will not be equal to L2.) PE 1 is at the head of the linked list for Label L1 since it was assigned the packet that came before. For the same reasons, PE 3 is at the head of the list for Label L2. When PEs finish processing, they are permitted to transmit the packets assigned to them if, and only if, they are at the head of the list. This prevents out-of-order transmission of packets.

However, this does not address the problem of packet fragmentation. That is, a PE is fragmenting the packet it is processing into multiple fragments, and the PE has to perform multiple "enqueue" operations to transmit all the fragments generated by it. That is, P1 and P2 arrive in order and are assigned to PEs PE1 and PE2. Now, PE1 decides to fragment P1 into P1-1, P1-2 . . . P1-m and, similarly, PE2 decides to fragment P2 into P2-1, P2-2 . . . P2$n$, respectively. The question arises how to maintain in sequence delivery without enforcing artificial sequencing. For example, transmitting all fragments of P1 prior to transmitting any of the fragments of P2 is quite restrictive. It is indeed required that P1-1 through P1-m be transmitted in the same order.

SUMMARY OF THE INVENTION

A method is provided of sequencing the delivery of packets of information from a router having a first processor installation of a plurality of processing elements to a second processor installation, wherein delivery of said packets of information must be completed in the order that said packets arrive at the first processor installation. The method comprises the steps of forming a linked list of PEs in the order in which they were delegated to process packets, which is in the order that they are received at the first processor installation, and fragmenting each packet of information into successive fragments. Each fragment is processed at the first processor installation. The last fragment of each packet of information in each linked list is labeled with the sequence in which that packet was received and enqueued in the order labeled for each last fragment on each linked list. Each fragment of each packet of information on a linked list is delivered as processed at said first processor installation in a given linked list, except the last fragment of each packet on its linked list to said second processor installation. Thereafter, transmitting the final fragment of each packet after processing if, and only if, that fragment is at the head of the queue, removing that fragment from the queue when transmitted, and reassembling each packet of information of said fragments at said second processor installation after all the fragments of said given packet of information are received at said second processor installation.

DESCRIPTION OF THE PREFERRED EMBODIMENT

According to the present invention, an improved method of transmitting a linked list of PEs from a router in an information handling device, such as an IBMPowerNP architecture, is provided. After each packet of information P1-Pn is received at the router, it is given a completion unit label depending upon the port from which it is to be transmitted and assigned a PE. A linked list of PEs is created for packets P having the same label. Each packet P or PE in each linked list is then fragmented. In the case where there are two packets in a linked list, there are fragments P1-1, P1-2 to P1-m, and P2-1, P2-2 to P2-n. However, only the final packet P1-m and P2-n in each PE receives the label. The other fragments do not. After each P1 and P2 fragments packets into fragments P1-1 through P1$m$-1 and P2 to P2$n$-1 in sequence, these fragments are transmitted "without completion unit label" and these fragments are preferably transmitted in the order fragmented in each PE irrespective of the transmission order of the fragments P1-I to P1-m-1 and P2-2 to P2-n-1 in the other PE. The last fragment of each packet, i.e. P1-m and P2-n, are labeled with a completion unit label, just as in the prior art, and the last packet of each fragment in each linked list can be transmitted if, and only if, it is at the head of the queue and all of the other fragments of the packets P1 or P2 in which the fragment is located have been transmitted. Out-of-order delivery is thus prevented since the fragments of packet 1 and packet 2 reach the final destination in arbitrary order, except the following:

1) The last fragment of packet 1 reaches prior to the last fragment of packet 2.
2) The other fragments of packet 1 reach before the last fragment of packet 1.
3) The other fragments of packet 2 reach before the last fragment of packet 2.

Figure 1:
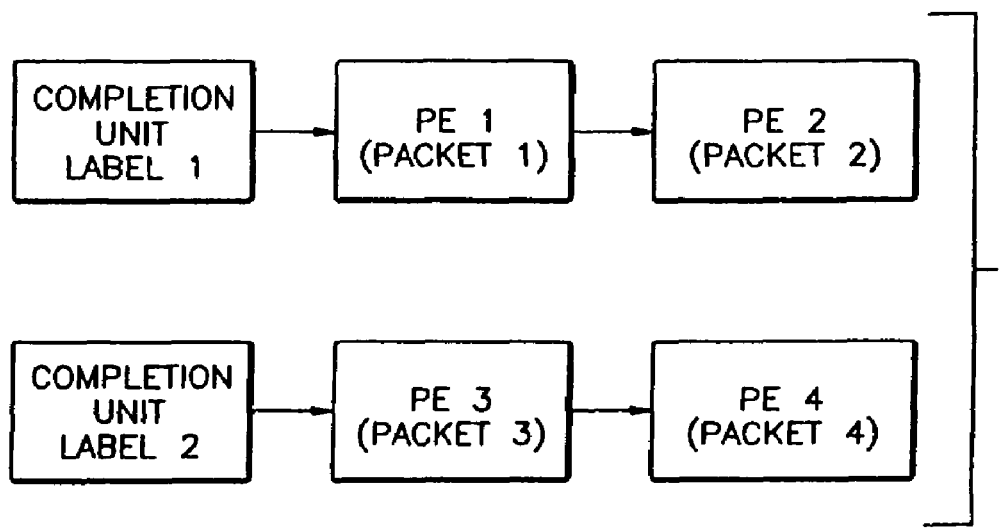
FIG. 1 is a diagrammatic representation of one prior art technique for delivering packets of information.
Figure 2:
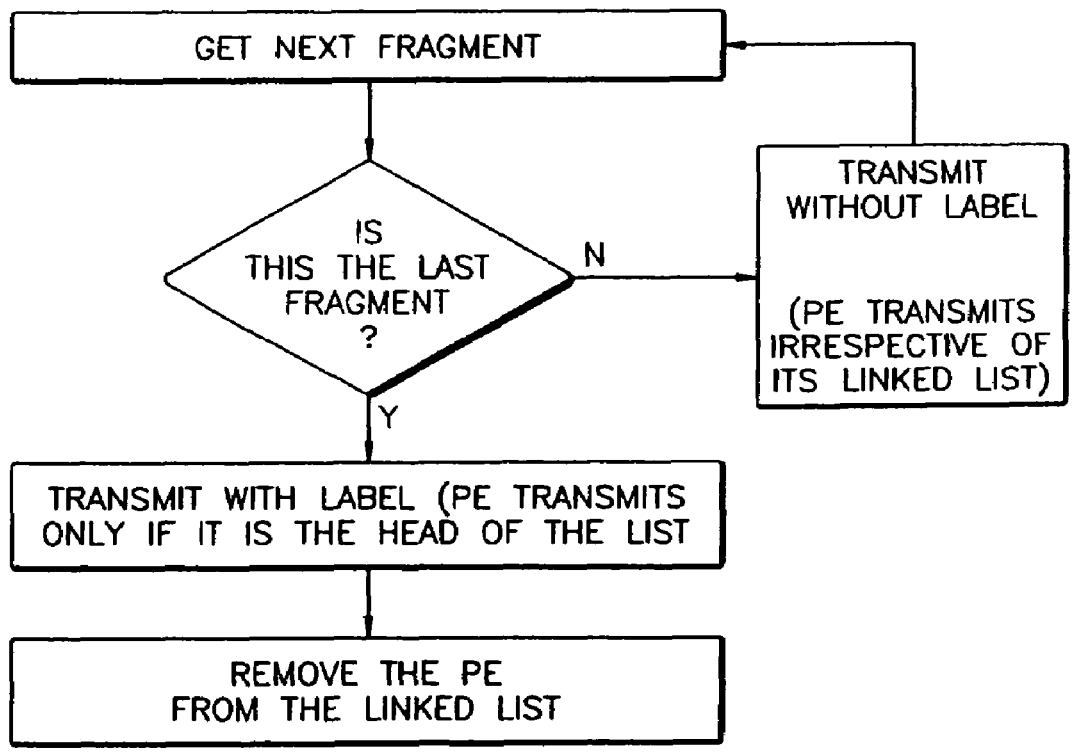
FIG. 2 is a flow diagram of the fragmentation and delivery technique of a linked list of packets of information according to this invention.

The processing element at the final destination will begin reassembling the fragments into a full packet, once it receives all the fragments belonging to that packet. Because of the above conditions, the final destination can and will reassemble packet 1 before packet 2. This method is illustrated in FIG. 2. Thus, it can be seen that the fragments, except the last fragment, of each packet can be processed at the processing elements at the router, and transmitted to the destination as soon as they are processed irrespective of where the packet is in the queue. It is only when the final fragment of a packet in a queue is processed that the completion unit label is consulted, and it is only the last fragment of a packet in a given queue that determines the final order of transmission. This allows transmission of most fragments of a packet (i.e. all but the last fragment) to be transmitted irrespective of where in the queue that the packet resides from which it was fragmented, and still maintain the proper order of the data packets received at the receiving processor installation by controlling the transmission of the last fragment of each packet to the required order.

Of course, multiple linked lists can be created depending upon the number of ports from which the data packets are to be transmitted. Also, the use of just two packets of information in a linked list is illustrative and more than two packets can be included, the requirement being that the last fragment of each packet is labeled in the order received and transmitted in the order received for the particular linked list.

While preferred embodiments of the invention have been described herein, variations in the design may be made, and such variations may be apparent to those skilled in the art of computer architecture, systems and methods, as well as to those skilled in other arts. The present invention is by no means limited to the specific programming language and exemplary programming commands illustrated above, and other software and hardware implementations will be readily apparent to one skilled in the art. The scope of the invention, therefore, is only to be limited by the following claims.

What is claimed is:

1. A method of sequencing the delivery of a series of packets of information from a router which has a first processor installation having a plurality of processor elements, to a second processor installation, and wherein delivery of said packets of information must be completed in the order in which said packets arrive at the first processor installation, comprising the steps of:

forming a linked list of the packets of information in the order in which said packets of information are received at said first processor installation;

fragmenting each packet of information into successive fragments and processing each fragment at said first processor installation;

labeling the last fragment of each packet of information in each linked list with the sequence in which the packet was received and enqueuing the order marked for each last fragment in each linked list;

delivering each fragment of each packet as processed at said first processor installation on a given linked list, except the last fragment of each packet on said linked list to said second processor installation;

thereafter transmitting the final fragment of each packet after processing if, and only if, that fragment is at the head of the queue on said linked list, and removing that fragment from the queue when transmitted; and reassembling each packet of information from said fragments at said second processor installation after all the fragments of said given packet of information are received at said second processor installation.

2. The invention as defined in claim 1 wherein there are multiple linked lists, and wherein multiple packets of information are transmitted from each linked list.

3. The invention as defined in claim 1 wherein the fragments of each packet of information are transmitted in the order in which they are fragmented.

* * * * *